United States Patent [19]
Luenser

[11] 3,730,313
[45] May 1, 1973

[54] CONTROL SYSTEM FOR A PLURAL SPEED PRESS

[75] Inventor: Kurt K. Luenser, De Soto, Tex.

[73] Assignee: Verson Allsteel Press Company, Dallas, Tex.

[22] Filed: May 3, 1971

[21] Appl. No.: 139,729

[52] U.S. Cl. ..........192/12 C, 192/87.14, 192/129 R, 192/146, 72/22, 72/441, 100/53
[51] Int. Cl. ........................F16d 67/04, F16p 3/00
[58] Field of Search..................192/4 R, 12 C, 17 A, 192/18 A, 129 R, 129 B, 87.14, 145, 146; 100/53; 72/22, 25, 389, 441

[56] References Cited

UNITED STATES PATENTS

| | | | |
|---|---|---|---|
| 3,306,122 | 2/1967 | Dehn | 192/4 R X |
| 1,243,986 | 10/1917 | Schoenky | 192/146 |
| 3,283,862 | 11/1966 | Warnock | 192/18 A |
| 2,856,044 | 10/1958 | Koenig et al | 192/145 X |
| 3,269,219 | 8/1966 | Hart | 192/146 X |
| 3,561,279 | 2/1971 | Beneke | 192/4 R X |

Primary Examiner—Allan D. Herrmann
Attorney—Richards, Harris & Hubbard

[57] ABSTRACT

The specification discloses a control system for a press machine having fast and slow speed clutches and a brake. Three fluid valves are selectively operable to direct pressurized fluid to either the brake or fast and slow speed clutches. A first switch is operable by the press ram when the press machine is operating at a fast speed in order to switch the fluid valves to engage the brake and to disengage both the fast and slow speed clutches. A second switch is operable after the first switch in order to switch two of the valves to disengage the brake and to engage the slow speed clutch. Switches are provided to detect the operational states of the fluid valves in order to detect malfunctions thereof.

15 Claims, 6 Drawing Figures

Patented May 1, 1973

INVENTOR:
KURT K. LUENSER

Richards, Harris & Hubbard
ATTORNEYS

Patented May 1, 1973
3,730,313
2 Sheets-Sheet 2
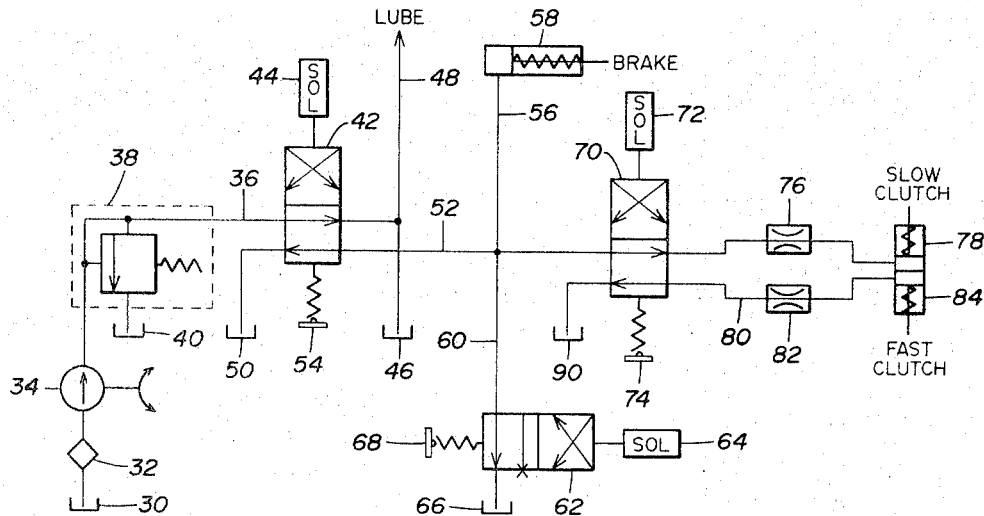
FIG. 2
| LINE NO. | SWITCH | DEGREES | | | | | DEGREES OF OPERATIONS |
|---|---|---|---|---|---|---|---|
| | | 0° | 90° | 180° | 270° | 360° | |
| A | 114 | ////// | ////// | ////// | //  | | 270-310 |
| F | 148 | | | ////// | ////// | | 180-335 |
| I | 164 | | | ////// | ////// | | 190-335 |
| B | 164' | ////// | ////// | | // | | 335-190 |
FIG. 4
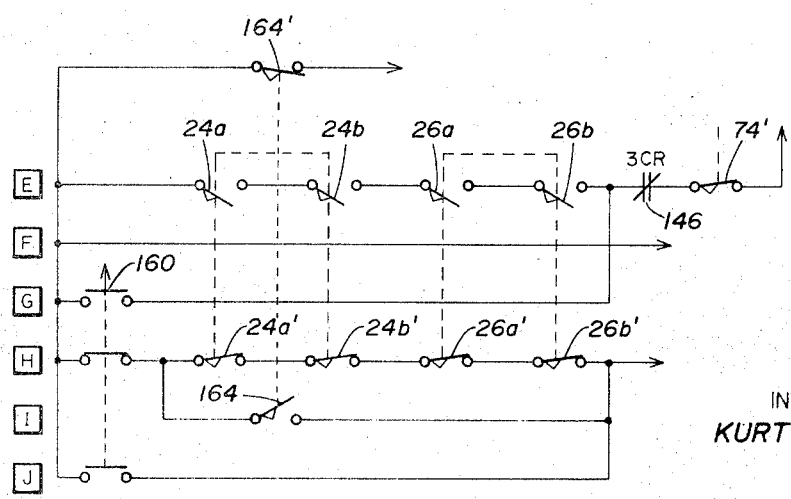
INVENTOR:
KURT K. LUENSER
FIG. 5
Richards Harris & Hubbard
ATTORNEYS

CONTROL SYSTEM FOR A PLURAL SPEED PRESS

FIELD OF THE INVENTION

This invention relates to press machines, and more particularly to control systems for plural speed press machines.

THE PRIOR ART

Press machines such as press brakes and the like are widely used to form the sheets of materials into desired shapes. In such press brake systems, a male ram is reciprocatingly driven into a female mold in order to press the sheet material into the desired mold shape. During operation of press brakes, it is generally desirable to move the press ram downwardly at a relatively fast rate and then to slow the ram just before contacting the sheet material in order to prevent the sheet material from "whipping up" and thus presenting a hazard to the press operator.

To eliminate the requirement of the press operator having to manually slip or jog a clutch to slow the press ram as the sheet material is being formed, it has heretofore been proposed to provide an automatically controlled plural speed transmission system for use on press brake machines. Disclosures of such plural speed press brake transmission systems are contained in U.S. Pat. No. 3,498,424, issued on Mar. 3, 1970, to Jene A. Beneke et al. and in U.S. Pat. application Ser. No. 773,140, filed Nov. 4, 1968, by Jene A. Beneke, both assigned to the present applicant.

In previously developed control systems for plural speed press brakes, it has been conventional to provide a limit switch which was tripped during operation of the press brake to switch the press ram from fast to slow speeds. Such previously developed control systems were not completely satisfactory in changing the speed of the press ram from fast to slow in a relatively short period of time and in a consistent manner. In some such previously developed press brake control systems, gear backlash occurred during changeover from fast to slow speeds. Moreover, such previously developed control systems were subject to malfunction due to loosening or breaking of a limit switch, or due to malfunctioning of a fluid valve or of the control solenoids of the system.

SUMMARY OF THE INVENTION

In accordance with the present invention, a control system is provided for operating a plural speed press brake wherein the press ram may be slowed from a fast speed in a relatively short period of time and in a consistent manner, without attendant gear backlash. Moreover, the present invention provides an extremely safe system which is not subject to failure due to malfunctioning of a limit switch or fluid valve.

In accordance with a more specific aspect of the present invention, a control system is provided for operating a plural speed forming machine having fast and slow clutches and a brake. The system includes a first switch operable at a predetermined point in the cycle of operation of the forming machine to disengage the fast clutch and to engage the brake. A second switch is operable after the actuation of the first switch to engage the slow clutch and to disengage the brake.

In accordance with another aspect of the invention, a speed control system for a plural speed press brake having a brake and fast and slow speed clutches includes structure for energizing the fast speed clutch to drive the press brake at a fast speed. A first switch is operable at a preset point during the stroke of the press brake for engaging the brake and for disengaging the fast speed clutch. A second switch is operable after the first switch for disengaging the brake and for engaging the slow speed clutch. Switches sense the position of the fast and slow speed clutches in order to control the operation of the press brake in case of malfunction.

In accordance with yet another aspect of the invention, a control system is provided for a press machine having a brake and fast and slow speed clutches which includes a first fluid valve operable to direct pressurized fluid to the brake and the clutches. A second fluid valve is operable to control the application of pressurized fluid to the brake. A third fluid valve is operable to direct pressurized fluid to either of the fast or slow speed clutches. A first switch is operable by a moving part of the press machine while the press machine is operating at the fast speed in order to switch the valves to engage the brake and to disengage the clutches. A second switch is operable after the first switch in order to switch the first and second valves to disengage the brake and to engage the slow speed clutch. Switches are provided to detect the operational states of the fluid valves to provide control of the brake and clutches in case of malfunctions.

DESCRIPTION OF THE DRAWINGS

For a more complete understanding of the present invention and for further objects and advantages thereof, reference is now made to the following description taken in conjunction with the accompanying drawings, in which:

FIG. 2 is a schematic view of the hydraulic actuation circuit for the present system;

FIG. 4 is a graph illustrating the operation of drive cam operated limit switches of the system during a cycle of operation of the press brake;

FIG. 5 is an electrical schematic circuit of a second embodiment of the present invention.

DESCRIPTION OF THE PREFERRED EMBODIMENTS

Figure 1:
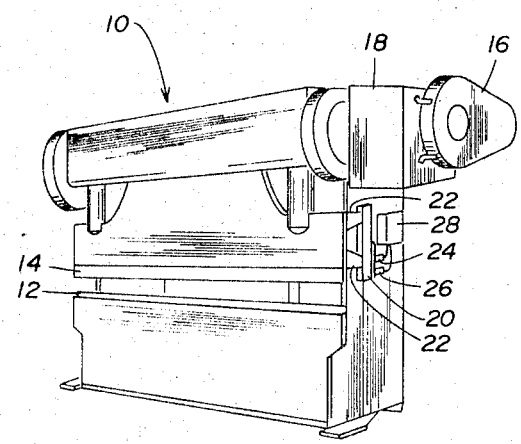
FIG. 1 illustrates a perspective view of a typical press brake having the present control system installed thereon.

Referring to FIG. 1, a press brake 10 comprises a female mold portion 12 and a vertically reciprocating male ram 14. In the position illustrated, the ram 14 is raised wherein a sheet of material may be inserted between the mold 12 and the ram 14. The ram 14 is then rapidly moved down to within a predetermined distance from the sheet of material and then slowed to press the sheet of material into the mold 12. After the pressing operation, the ram 14 rapidly moves upwardly to allow the formed sheet of material to be removed and a new sheet of material to be inserted.

The press brake 10 is powered by a motor that drives a flywheel located in the flywheel casing 16. The flywheel provides motion through a transmission 18 to vertically move the ram 14. A vertically disposed elongated cam 20 is connected by brackets 22 to the ram 14. Vertical movement of the ram 14 causes the cam 20 to sequentially actuate a pair of limit switches 24 and 26 mounted on the side of the press brake. The actuation of the limit switches is sensed by electrical circuitry within a circuit box 28 to control the operation of the transmission 18 for control of the ram speed.

In operation, the initial rapid movement of the ram 14 is automatically slowed by the application of a brake at a predetermined point in the downward movement of the ram 14. The ram 14 then moves slowly downwardly in order to eliminate "whipping up" during the pressing operation. As will be later described, the microswitches 24 and 26, with associated circuitry, provide a dependable safety feature to prevent injury to the operator by insuring that the ram 14 is either reduced to the safe slow speed during pressing operations or bringing the ram 14 to a complete stop in case of a malfunction. Various operating controls such as start and stop buttons and the like are normally located on the press brake, but are omitted in FIG. 1 for ease of illustration.

For a detailed disclosure of a suitable two-speed transmission and brake system for use with press brake 10, reference is made to the previously identified U.S. Pat. No. 3,498,424 and application Ser. No. 773,140, filed Nov. 4, 1968.

FIG. 2 illustrates a hydraulic circuit which is dependent upon the actuation of the limit switches 24 and 26, and other associated limit switches to be later described, to provide for selective actuation of the transmission system and the brake system. A main reservoir 30 of hydraulic fluid is equipped with a conventional oil strainer 32 and provides hydraulic fluid through a line to a constant delivery, reversing gear-type pump 34. Pump 34 is conventionally operated by the flywheel of the system shown in FIG. 1 to provide a constant supply of hydraulic fluid through a line 36 to a relief valve 38. Relief valve 38 dumps hydraulic fluid to a reservoir 40 when the fluid pressure rises above a preselected level in the system. Hydraulic fluid is supplied through the line 36 to a two-position, four-way valve 42. A solenoid 44 is operated by limit switches in the system to control the operation of the valve 42. In the illustrated position of the valve 42, hydraulic fluid is provided to the line 36 to a drain reservoir 46 and to a lube line 48 for lubrication of the clutches and other parts of the transmission system.

A return reservoir 50 receives hydraulic fluid draining from a line 52. A limit switch 54 is positioned to sense the position of the valve 42 to provide an indication thereof to the electrical circuitry to be subsequently described. A line 56 is connected to line 52 to supply fluid to a brake cylinder 58. A line 60 supplies hydraulic fluid to a second two-position, four-way valve 62, the position of which is controlled by a solenoid 64. Solenoid 64 is operated by the limit switches of the control circuitry, as will be subsequently described. In the illustrated position of the valve 62, fluid drains into a reservoir 66. A limit switch 68 is positioned to sense the position of the valve 62 and provide indications thereof to the electrical control circuitry of the invention.

Fluid is also supplied via the line 52 to a third two-position, four-way valve 70 which is operated by a solenoid 72 in response to actuation of the electrical control circuitry. A limit switch 74 is provided to sense the position of the valve 70. In the illustrated position of the valve 70, fluid is supplied via the line 52 and through a flow control device 76 to a first duplex clutch 78 which provides a slow speed of operation to the transmission. A line 80 communicates via a flow control device 82 to a second duplex clutch 84 which provides a fast mode of operation to the transmission system. Line 80 passes through the valve 70 for communication with the reservoir 90.

In operation of the hydraulic circuit shown in FIG. 2, solenoid 72 is energized to supply hydraulic fluid via the valve 70 and through the line 80. The fluid is then applied through the flow control device 82 to energize the fast clutch 84 to operate the ram 14 downwardly at a rapid speed. If the limit switches 24 and 26 are properly energized by the ram 14 in the manner to be subsequently described, the valves are switched to disengage both clutches and to engage the brake 58. Subsequently, the solenoid 72 is deenergized to change the position of the valve 70 such that hydraulic fluid is supplied via the flow control device 76 for energization of the slow clutch 78. The ram 14 is thus driven at a slow speed. Hydraulic fluid then drains from clutch 84 via line 80 to the reservoir 90. When the ram 14 reaches its lowest position relative to the female mold portion 12, a limit switch is actuated to operate the solenoid 72 in order to energize the clutch 84 and to deenergize clutch 78 so that the ram 14 is returned to its upper position at a rapid rate of speed.

When the ram gets to the top of its stroke, suitable limit switches are actuated to deenergize each of the solenoids 44, 64 and 72 in order to stop operation of the press brake until the next sheet of material is properly positioned. The brake cylinder 58 is spring clamped to hold the press brake ram 14 at the upper position until the next stroke is desired. As will be subsequently described, various modes of operation are possible with the present system depending upon settings made in the electrical control circuitry. Additionally, various safety features are provided through the use of the limit switches 24 and 26, and the sensing limit switches 54, 68 and 74 in order to provide safety to the operation of the system.

Figure 3:
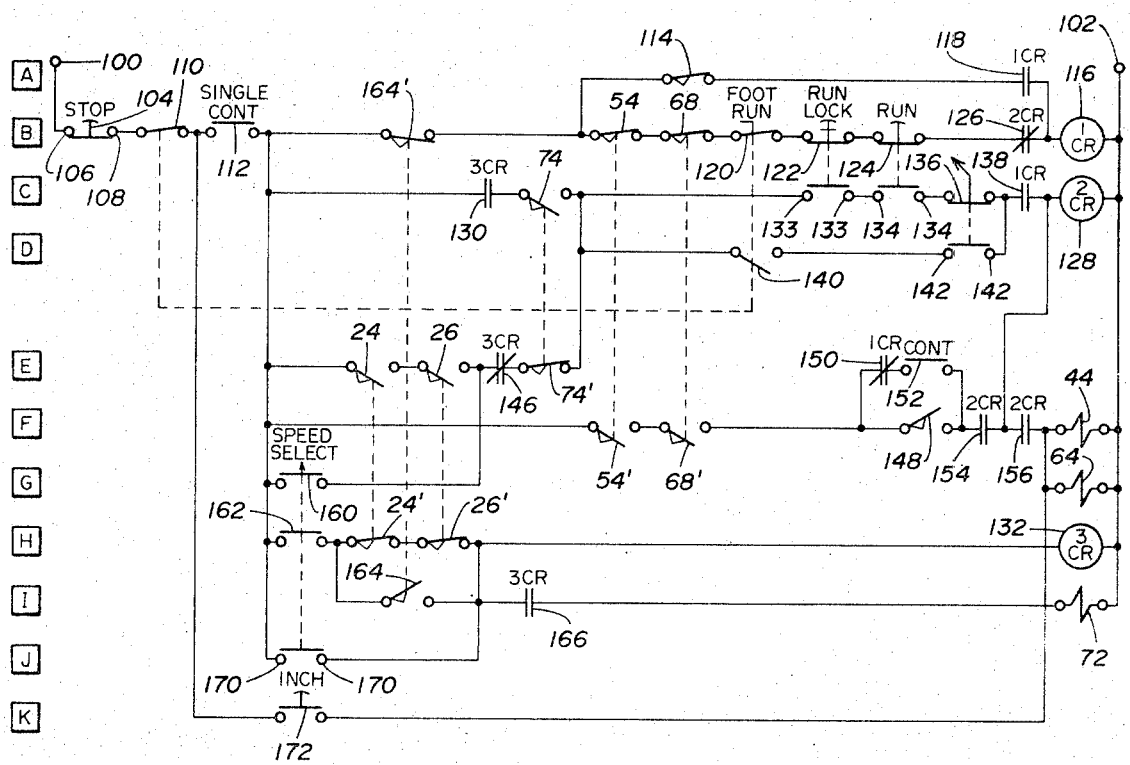
FIG. 3 is a schematic illustration of the electrical control portion of the present system.

FIG. 3 illustrates in schematic detail the first embodiment of the clutch control circuitry of the invention. Line levels of the electrical control circuit have been designated with numbers A-K for ease of description. Energizing voltage is applied to the circuitry across terminals 100 and 102. A STOP pushbutton switch 104 may b2 manually operated to interconnect terminals 106 and 108.

A normally closed switch 110 is controlled by a foot control switch operable by the machine operator. A single speed connection 112 may be closed to provide a single speed continuous operation of the machine. Continuous operation of the press brake requires automatic feed devices, and is generally not used for hand fed applications.

A limit switch 114 is disposed adjacent a driving cam in the transmission 18 (FIG. 1) and is opened and closed during each cycle of rotation of the cam in order to control the operation of an anti-repeat relay 116.

Anti-repeat relay contacts 118 are normally open and are controlled by the relay 116 in the conventional manner. Limit switch 114 opens from 270° to 310° of operation of the driving cam to deenergize the anti-repeat relay 116 during that portion of each cycle of system operation.

Limit switches 54 and 68, previously described with respect to FIG. 2, sense the position of valves 42 and 62. Limit switches 54 and 68 are connected in series with one another and control the operation of respective gang switches 54' and 68'. A foot run switch 120 may be controlled by the foot of the machine operator in order to control the operation of the press brake. Operation of the foot-run switch 120 also controls the operation of the switch 110 which is ganged with switches 120 and 140. A run lock button 122 and a run button 124 may be manually actuated by the machine operator in order to place the machine in a run position.

A normally closed set of relay contacts 126 are controlled by a control relay 128 connected on line D. Also connected on line D are a set of normally opened relay contacts 130 which are controlled by a control relay 132 connected on line H. Limit switch 74 is connected in line C and controls the operation of a gang switch 74'. The run lock button 122 is adapted to connect contacts 133 located on line C, and the run button 124 is adapted to close with contacts 134. A hand or foot operation switch 136 is also connected in line C in series with a normally open set of relay contacts 138 which are controlled by the control relay 116. Control relay 128 is connected in series on line C as previously noted.

A switch 140 is connected in line D and is operated along with the foot run switch 120. Also on line D, contacts 142 are connected when the switch 136 is depressed. The ram operated limit switches 24 and 26 are connected in series in line E. These switches also control the operation gang switches 24' and 26'. As previously noted, the limit switches 24 and 26 are vertically mounted on the side of the press brake 10 as shown in FIG. 1, and are sequentially operated by the cam 20 on the male ram 14. As will be subsequently described, the limit switches 24 and 26 control the operation of the clutch and brake mode of the control circuit shown in FIG. 2. A normally closed set of relay contacts 146 are connected in series in line E with switches 24 and 26. The switch 74' is connected in series with a normally closed set of relay contacts 146, with one terminal of the switch 74' being commonly connected to lines C and D.

Ganged switches 54' and 68' are connected in series in line F with a rotary cam actuated limit switch 148 which is controlled by rotation of the driving cam in the transmission 18. This limit switch opens when the rotary cam is turned 335° to deenergize the relay 128. A normally closed set of relay contacts 150 are connected across switch 148, the relay contacts being controlled by the control relay 116. A switch 152 is provided to allow continuous operation of the system when depressed. A pair of normally opened sets of relay contacts 154 and 156 are connected in series in line F with the solenoid 144, previously described in FIG. 2. Both sets of relay contacts 154 and 156 are controlled by the control relay 128. A common connection line is provided from one terminal of the control relay to line F between the sets of contacts 154 and 156.

A speed select switch 160 is connected in line G, with one terminal of the switch contacts being connected to line E. Solenoid 64, previously described in FIG. 2, is also connected in line G across solenoid 44. Speed select switch 160 is also operable to close upon contacts 162 connected in line H in series with gang switches 24' and 26'. The control relay 132 is also connected in line H. A limit switch 164 is also operable by the rotary drive crank cam in transmission 18 according to a present sequence. Switch 164 is ganged with a switch 164' located in line B of the circuit. When switch 164 is open, switch 164' is closed. As will be later described, the rotary cam limit switch 164 closes to initiate the fast speed during two-speed operation of the circuit. Should switch 164 fail to re-open, switch 164' will be open in order to prevent the reenergization of the control relay 116. Thus, a subsequent cycle of operation of the press brake at fast speed is prevented by switch 164'. In addition, switch 164' provides backup protection for the switch 114, as either switch may deenergize the control relay 116. In case the switch 164 fails to close during operation of the system, the entire down stroke of the press brake will be at the slow speed, and therefore will be safe and detectable.

A set of normally opened relay contacts 166 is also connected in line I in series with solenoid 72 which controls valve 70 as previously noted. The speed select switch 160 is operable to close across contacts 170 connected in line J, and an inch button 172 may be actuated by the machine operator to provide an inching operation of the system.

In operation of the system shown in FIGS. 1–3, the press brake 10 may be selectively operated in any one of a plurality of operation modes including single stroke-two speed, single stroke-fast speed, single stroke-slow speed, inch or continuous. The single stroke-two speed mode of operation is the most frequently used control and provides a fast approach, slow forming and fast return. In this mode, assuming that the main press brake motor is running forward and the selector switches are positioned for single stroke-two speed, current will be applied via line B to energize the control relay 116. To position the initial switches, the button switch 112 is depressed and switch 136 is set for either hand or foot operation. For hand operation, the switch 136 is positioned as shown on line C. For foot operation, the switch 136 is depressed to close against contacts 142 on line D. Energization of relay 116 causes the normally open relay contacts 118 and 138 to close. As the limit switch 114 is closed at this portion of the operating cycle, current is applied through the limit switch 114 and the closed contact 118 in order to hold the control relay 116 open. Additionally, current is applied through the closed switches in line H to energize the control relay 132, which closes the normally open relay contacts 166 to thereby supply current to the solenoid 72 (FIG. 2). Solenoid 72 is then energized to switch the valve 70 to the fast mode of operation. Switching of valve 70 actuates the limit switch 74, which closes (line C) to prepare the run button circuit.

At this time, either of the foot run switches 120 or the run buttons 122 or 124 are depressed and held depressed until bottom dead center of the ram stroke. Depression of a run button interrupts the supply of current via line B to the control relay 116, but the relay 116 is maintained in an energized state due to the holding circuit via line A provided by switch 114 and the relay contacts 118 being closed.

If the system is to be operated by the hand operated run switches, the switch 136 is positioned in the position as shown to close on contacts in line C. If the system is to be operated by the foot run switch 120, the switch 136 is depressed to close against contacts 142 on line D. If the system is to be operated by the hand run switches, the run button switches 122 and 124 are pressed to supply current through the closed relay contacts 130 which have been closed by energization of the control relay 132. Current is also supplied through the closed limit switch 74 to energize the control relay 128.

If the system is to be operated by the foot run switch 120, current is supplied through the relay contacts 130 and limit switch 74 (line D) to energize the control relay 128. Energization of relay 128 causes the normally opened relay contacts 154 and 156 to close to supply current to energize solenoids 44 and 64. This causes the valves 42 and 62 (FIG. 2) to be energized to thereby direct hydraulic fluid to the fast clutch 84 and to release the brake 58. This causes the ram 14 to move downward at a fast speed. Operation of the valves 42 and 62 close the limit switches 54 and 68 (line B) to interrupt the run circuit on line B and to condition the current path on line F by closing the gain switches 54' and 68'.

The ram continues downward at fast speed until the first limit switch 24 is energized. Upon the closing of limit switch 24, the gang switch 24' is opened to deenergize the control relay 132. This causes contacts 166 to open to deenergize solenoid 72. Additionally, contacts 130 open, along with the limit switch 74, to terminate the current supply to the control relay 128, thereby opening contacts 154 and 156 to energize solenoids 44 and 64. This deenergizes the fast clutch 84 and engages the brake 58 by supplying pressurized hydraulic fluid via line 56. The ram 14 is thus braked until the second limit switch 26 is actuated by the ram 14.

Current is then again supplied via the closed switches 24 and 26. Current is applied through the normally closed contacts 146 and closed gang switch 74' to energize the control relay 128 via either line C or D, according to which of the manual or foot run switches have been selected. Energization of relay 128 causes the relay contacts 154 and 156 to close, thereby reenergizing solenoids 44 and 64. Valves 42 and 62 are thus switched to direct pressurized fluid through the deenergized valve 70 to the slow clutch 78. The down stroke of the ram 14 then continues at slow speed for the forming operation.

Just after bottom dead center of the movement of the ram 14, the rotary limit switch 164 is actuated and closes to supply current to reenergize the control relay 132. This causes the relay contacts 166 to close to again energize the solenoid 72 to switch valve 70 to supply pressurized hydraulic fluid to the fast clutch 84. The slow clutch 78 is disengaged and the fast clutch operates to return the ram 14 in a fast speed to the top of its stroke. The switch 164' operates to prevent operation of the system in the fast speed in case switch 164 fails to reopen, as previously described. If switch 164 fails to close, the entire next down stroke of the ram will be at slow speed.

Operation of the limit switches 114, 148, 164 and 164' are illustrated in FIG. 4, where it may be seen that the limit switch 164 is actuated to close at approximately between 190° and 335° of a rotation cycle of the rotary drive cam. Conversely, switch 164' is open between 335° and 190° of the cam rotation cycle. Limit switch 114 opens from 270° to 310° to thereby deenergize the anti-repeat control relay 116. This opens the contacts 118 to eliminate the hold circuit for the relay 116 to prevent repetition of the cycle. Additionally, the contacts 138 are opened to disconnect the run button circuit from the control relay 128. The limit switch 148 closes at approximately the bottom of the stroke of the ram to provide a holding circuit around the normally open run button contacts 132 and 134. The limit switch 148 opens at 335° to deenergize the control relay 128 to thereby deenergize the solenoids 44 and 64. The fast clutch 84 is thus disengaged and the brake 58 is engaged to stop the ram 14 at the top of its stroke. The control relay 132 remains energized to maintain the solenoid 72 and the valve 70 energized.

The run buttons may thus be effective at this point in operation only when the anti-repeat relay 116 is again energized. The anti-repeat relay 116 will energize only when the buttons in use have been released and when the limit switches 54 and 68 have been released to indicate that the valve 42 and 62 are in the deenergized position. Relay 116 will also only energize when the normally closed clutch relay contacts 150 are closed to indicate that the relay 116 has not stuck in an energized position.

It will thus be seen that a number of safety features are provided by operation of the present system. For example, if either valve 42 or 62 fails to energize, the brake 58 would not release and neither the slow nor the fast clutches 78 and 84 engage. In case the press ram 14 is in motion and either valve 42 or 62 "drops out," the clutch would disengage and the brake 58 would engage to cause the press ram to immediately stop. If the valve 70 failed to energize, the press ram would operate in slow speed only. If the ram 14 were moving at fast speed and the valve 70 "dropped out," the ram 14 would decelerate to slow speed. In case one of the limit switches 24 or 26 breaks or malfunctions, the ram 14 would be stopped. The use of the limit switches 54, 68 and 74 provide additional safety features by checking to insure that the valves are in the proper operating condition. Moreover, switch 164' provides safety features in case of malfunction of switch 164.

In addition to the safety features provided by the present system, it has been found that the response of the press brake control system is improved. Previously developed control systems require substantial time intervals for the switching of valves, while the present control system is able to brake the ram down to a slow speed before it is required to energize the slow speed clutch. This eliminates gear backlash and tends to increase the operating response of the system.

The limit switches 24 and 26 may be varied in position to provide differences in operating characteristics of the press by varying the amount and time of slow-down of the press ram 14. Additionally, the spring tension of the brake cylinder is adjustable to allow a variable response time of the press ram transistion from fast to slow speed.

In the inch mode of operation, the inch button 172 is depressed, thereby energizing solenoids 44 and 64 to energize the slow clutch 78. The ram 14 will then move downwardly at the slow speed. Releasing of the inch button 172 will cause the ram to immediately stop. The inch function is primarily intended for set up and testing procedures rather than for a normal operation.

In the single stroke-fast speed operation, the speed select button 160 is depressed to close across contacts 170. Thus, although the limit switches 24 and 26 are energized as the ram 14 moves downwardly, the switches have no effect and the ram continues to move downwardly at a fast speed.

In the single stroke-slow speed operation, the speed select button 160 is pulled upwardly to open contacts 162 in line H, as well as contacts 170 in line J. Thus, the fast solenoid 72 and relay 132 are not permitted to energize and the ram continues to move at slow speed. The slow down limit switch contact of limit switches 24 and 26 on line E are bypassed with the selector switch contact on speed select button 160 contact (line G).

For the continuous function operation, either the run or foot buttons are energized and repeated press stroking is then provided. Once initiated, the ram will cycle continuously until deenergized by the STOP button 104. The speed setting selector switch 160 is effective on continuous operation. However, the point at which the slow down of the ram will occur will be different than single stroking, due to changes in the ram speed. Continuous operation requires automatic feeding devices and prevents special safety and design problems, and thus this continuous operation should not be used for hand fed applications.

Figure 6:
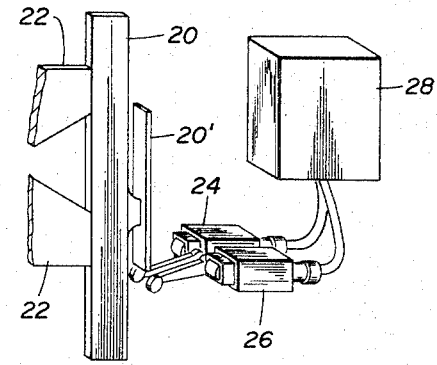
FIG. 6 is a perspective view of a second embodiment illustrating the horizontal arrangement of limit switches of the present system.

In the embodiment of the system shown in FIGS. 1-4, the limit switches 24 and 26 are spaced vertically apart along the side of the press 10, and are thus sequentially actuated by the cam 20 as the ram 14 moves. In the preferred embodiment of the invention, the limit switches 24 and 26 are mounted on the same horizontal plane in side-by-side relationship as best shown in FIG. 6. in this embodiment, the switches are generally simultaneously energized by the cam extension 20' which is attached to the cam 20. This cam extension 20' may be adjusted for various modes of operation. In the preferred embodiment shown in FIG. 6, the limit switches are of the two step type, wherein a first arc of movement energizes a first contact and a second arc of movement energizes the second contact. An example of such a two-step limit switch is the Cutler-Hammer Type L limit switch, wherein a first 15° of movement actuates a first contact and a second 15° of movement energizes the second contact of the limit switch. The use of limit switches 24 and 26 in the illustrated horizontal position provides early stopping of the press ram 14 if either of the switch arms fails to properly function. The offset nature of operation of each of the switches again provides improved response to the press by initiating braking of the press ram before the slow speed clutch is energized.

FIG. 5 illustrates the electrical connection of the preferred embodiment of the invention, wherein only the speed change portion of the circuit shown in FIG. 3 is illustrated. The remainder of the circuit shown in FIG. 3 remains unchanged. The contact 24a and ganged switch 24a' are operated in response to the first 15° of movement of the switch arm of limit switch 24, while contacts 24b and 24b' are energized by the second 15° of movement of the switch arm. Contacts 26a and 26a' are energized by the first 15° of movement of the switch arm of limit switch 26, while contacts 26b and 26b' are energized by the second 15° of movement of the switch arm of limit switch 26. Operation of the system remains essentially the same as previously described, with switches 24a, 24a' and 26a, 26a' being generally simultaneously operated. Additionally, contacts 24b, 24b' and 26b, 26b' are generally operated simultaneously.

The present invention thus provides an improved press control system wherein a consistent changeover from fast to slow speeds is provided, and wherein an improved response of the press brake is provided, along with elimination of gear backlash and the like. The present system is able to change from fast to slow speeds in a shorter interval of time than prior systems due to the fact that the ram is initially slowed before the slow clutch is energized.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. In a speed control system for a plural speed press machine having a brake and fast and slow speed clutches, the combination comprising:
   means for energizing said fast speed clutch to drive said press machine at a fast speed,
   first switch means operable at a preset point during the stroke of said press machine for disengaging said fast speed clutch and for engaging said brake,
   second switch means operable after said first switch means for disengaging said brake and for engaging said slow speed clutch, and
   means for sensing the position of said fast and slow speed clutches for controlling the operation of said press machine in case of malfunction.

2. The combination of claim 1 wherein said energizing means comprises:
   a source of pressurized fluid,
   fluid valve means, and
   solenoid means operable by said switch means for controlling said valve means.

3. The combination of claim 2 wherein said sensing means comprises switch means operable in response to the position of said valve means.

4. The combination of claim 1 wherein said switch means are sequentially operable by the press ram.

5. A control system for operating a plural speed press machine comprising:
   means for engaging a fast speed clutch to operate said press machine at a fast speed,
   means for engaging a slow speed clutch to operate said press machine at a slow speed,
   means for engaging a brake to apply a braking force to said press machine, a first switch operable at a selected point in an operation cycle of said press machine to cause the disengagement of said fast speed clutch and the engagement of said brake, a second switch operable after said first switch to cause the engagement of said slow speed clutch and disengagement of said brake, and means carried on a moving part of said press to sequentially actuate said first and second switches during a machine operation whereby said machine is braked subsequent to fast speed operation and prior to slow speed operation and whereby operational speed change is smoothly effected and machine response time is decreased.

6. The system of claim 5 wherein said forming machine comprises a press and wherein said switches are mounted on a common horizontal plane.

7. The control system of claim 5 wherein said switches are mounted along a vertical plane.

8. The control system of claim 5 wherein said switches are mounted along a horizontal plane, and wherein each of said switches includes two actuation states.

9. The control system of claim 5 and further comprising: means for sensing the states of said engaging means and for preventing further operation of said press machine in case of malfunction of said engaging means.

10. The control system of claim 5 and further comprising:

means for moving said switches relative to one another to vary the time interval between actuation of said first and second switches.

11. A control system for a press machine having a brake and fast and slow speed clutches comprising:

a first fluid valve operable to direct pressurized fluid to said brake and said clutches, a second fluid valve operable to control the application of pressurized fluid to said brake, a third fluid valve operable to direct pressurized fluid to either of said fast or slow speed clutches, first switch means operable by a moving part of said press machine while said press machine is operating at the fast speed for switching said valves to engage said brake and to disengage said clutches, second switch means operable after said first switch means for switching said first and second valves to disengage said brake and to engage said slow speed clutch, and means for detecting the operational states of said fluid valves to provide control of said brake and clutches in case of malfunctions.

12. The control system of claim 11 wherein said fluid valves are operated by solenoids responsive to said first and second switch means.

13. The control system of claim 11 wherein said detecting means comprise switches responsive to the operating states of said fluid valves.

14. The control system of claim 11 and further comprising means for preventing recycling of said press machine unless said valves and switch means are properly operated.

15. The control system of claim 11 and further comprising:

cyclically operated switch means for returning said press machine at the fast speed for the beginning of another cycle, and ganged switch means for preventing operation of said press machine at said fast speed in case of malfunction of said cyclically operated switch means.

* * * * *